US012330184B2

(12) United States Patent
Kozak et al.

(10) Patent No.: US 12,330,184 B2
(45) Date of Patent: Jun. 17, 2025

(54) SYSTEMS AND METHODS FOR VACUUM IMPREGNATION

(71) Applicant: Henkel AG & Co. KGaA, Duesseldorf (DE)

(72) Inventors: William G. Kozak, Waterford, MI (US); Daniel B. Irvin, Albany, IN (US)

(73) Assignee: Henkel AG & Co. KGaA, Duesseldorf (DE)

( * ) Notice: Subject to any disclaimer, the term of this patent is extended or adjusted under 35 U.S.C. 154(b) by 123 days.

(21) Appl. No.: 17/810,950

(22) Filed: Jul. 6, 2022

(65) Prior Publication Data

US 2022/0331830 A1 Oct. 20, 2022

Related U.S. Application Data

(63) Continuation of application No. PCT/US2021/013088, filed on Jan. 12, 2021.

(60) Provisional application No. 62/961,240, filed on Jan. 15, 2020.

(51) Int. Cl.

| | |
|---|---|
| ***B05D 1/18*** | (2006.01) |
| ***B05C 3/109*** | (2006.01) |
| ***B05C 11/10*** | (2006.01) |
| ***B05C 11/11*** | (2006.01) |

(52) U.S. Cl.

CPC .......... *B05C 3/109* (2013.01); *B05C 11/1002* (2013.01); *B05C 11/11* (2013.01); *B05D 1/18* (2013.01)

(58) Field of Classification Search

CPC ......... B05D 7/22; B05D 1/18; B05D 2259/00

See application file for complete search history.

(56) References Cited

U.S. PATENT DOCUMENTS

| | | | | |
|---|---|---|---|---|
| 4,144,836 A * | 3/1979 | Bernath | B05C 3/09 118/421 |
| 4,196,231 A | 4/1980 | Hubers | |
| 2016/0250660 A1 | 9/2016 | Jarmon et al. | |

FOREIGN PATENT DOCUMENTS

| | | |
|---|---|---|
| CN | 101060918 A | 10/2007 |
| EP | 0151050 B1 | 10/1989 |
| JP | S5933068 A | 2/1984 |
| JP | S63069542 U | 5/1988 |
| JP | H04346864 A | 12/1992 |
| JP | H05184998 A | 7/1993 |
| JP | H05197170 A | 8/1993 |
| JP | 2722137 B2 * | 3/1998 |
| JP | 2003217991 A | 7/2003 |
| JP | 2014094342 A * | 5/2014 |

(Continued)

OTHER PUBLICATIONS

International Search Report for PCT/US2021/013088 mailed May 6, 2021.

(Continued)

*Primary Examiner* — Kelly M Gambetta

(74) *Attorney, Agent, or Firm* — Mary K. Cameron

(57) ABSTRACT

A vacuum impregnation system and processes that subject a part to a vacuum, immerse the part in a polymer impregnating liquid, and apply positive pressure to the part to introduce the polymer impregnating liquid into part porosities, releasing the pressure to atmospheric pressure and solidifying the polymer impregnating liquid, preferably without an active polymerization step.

13 Claims, 4 Drawing Sheets

(56) References Cited

FOREIGN PATENT DOCUMENTS

| | | | |
|---|---|---|---|
| TW | 201002431 | A | 1/2010 |

OTHER PUBLICATIONS

International Preliminary Report on Patentability for PCT/US2021/013088 mailed Mar. 31, 2022.

* cited by examiner

SYSTEMS AND METHODS FOR VACUUM IMPREGNATION

TECHNICAL FIELD

This invention generally relates to the field of vacuum impregnation systems and processes that subject a part to a vacuum, immerse the part in an impregnating liquid, and apply positive pressure to the part to introduce the impregnating liquid into part porosities, where the impregnating liquid solidifies.

BACKGROUND OF THE INVENTION

Vacuum impregnation systems are used to seal pores and small gaps in articles such as single parts or assembled parts. Such sealing is useful, for example, to reduce or prevent ingress of water, oils, soils and other contaminants into the parts or assemblies, and help prevent corrosion of the article. The article may include cast metals and other materials, including a combination of metal and plastic materials. In general terms, vacuum impregnation is performed by subjecting the article to a vacuum, contacting the article with an impregnation liquid, then optionally applying a positive pressure to help move the impregnation liquid into the pores and gaps. Vacuum impregnation processes can be categorized into two groups: dry vacuum and wet vacuum.

Dry vacuum impregnation means the parts are in a sealed chamber containing a gas phase environment, such as ambient air, when the vacuum is applied to remove the gas phase from the chamber, including from pores and gaps in the article; then sealant is transferred from a reservoir into the sealed chamber while the vacuum is maintained; when the vacuum is released sealant is drawn into the pores and unused sealant is returned to the reservoir. Dry vacuum impregnation can include a step of applying positive pressure usually about 4-7 bar (400-700 kPa) after the vacuum is released and holding the pressure for a selected time to allow sealant to penetrate the porosity.

Wet vacuum means the parts are immersed in the impregnation liquid in a vacuum chamber, then the vacuum is applied and held until all of the air is removed from the vessel and the sealant. Wet vacuum has the challenge of overcoming the hydraulic head pressure of the sealant in the vacuum chamber, making the negative pressure on the pores and gaps less. This has the drawback of trapping a finite amount of air in the pores that may ultimately result in poorer seal quality. In a second step, the vacuum is released, and the articles are left in the sealant at atmospheric pressure to allow the sealant to penetrate the pores and gaps in the article.

Most commonly, the impregnation liquid is a low viscosity monomer solution which, after part impregnation, is easily removed from the exterior of the part, by spinning or like mechanical means, leaving liquid in the pores and gaps. The low viscosity monomer solution is then polymerized in situ in a downstream processing step. Low viscosity monomer materials have been successful commercially at least partly because they are easier to force into the pores and gaps of parts. Common monomeric materials include for example methacrylate monomers, typically having viscosities of about 5 mPa·s to about 65 mPa·s (5-65 centipoise) at 23° C. These are thermoset materials that polymerize and crosslink into a hard polyacrylate solid. It has been found that, for a variety of reasons, these in situ polymerized seals tend to fail at sealing gaps between adjacent metal and plastic parts on certain electronics assemblies, such as cell phone assemblies, in simulated lifetime durability tests.

In efforts to overcome the deficiencies of in situ polymerized seals, polymeric impregnating liquids that require no polymerization or cross-linking after impregnation, only drying to form a seal may replace in situ polymerized monomer solutions. The polymers may be dissolved or dispersed in a solvent, such as water. One disadvantage of polymer/solvent impregnating liquids made at viscosities similar to monomer solutions by addition of quantities of solvent is the energy/time required to dry them. Another likely disadvantage is ineffective sealing of pores and gaps due to shrinkage of the polymer sealant upon drying due to lack of sufficient polymer solids in the impregnating liquid.

To solve this problem, Applicants selected thick (i.e., viscous) polymer materials containing higher polymer solids and less solvent with viscosities in a range of about 50 Pa·s to as much as 3000 mPa·s or more depending on the non-Newtonian behavior of the polymer (50-3000 centipoise). The thick polymer solution or dispersion has been found to provide improved sealing performance and does not require cross-linking, but leads to other disadvantages. For example, the thick polymer solution is less suitable for using in the wet vacuum process because head pressure on the liquid solution limits how much air can be removed from the pores and gaps, especially for parts that are further below the surface of the liquid, where positive pressure of the liquid and vapor pressure of any solvent works against the vacuum being drawn. Combined with the polymeric impregnant's higher viscosity, this leads to reduced sealing performance. The issue caused by liquid head pressure can be reduced by performing the vacuum impregnation process in shallow tanks, but the commercial production volumes of small parts would require a large number of relatively large diameter pressure rated tanks, which would be cost prohibitive, particularly where stainless steel may be needed to resist corrosion by certain polymer impregnating liquids.

The problems with using the wet vacuum process can be addressed, to some degree, by using a dry vacuum process. With a dry vacuum, the vessel height does not affect the seal quality because there is no head pressure to overcome, and so a smaller number of deeper small-diameter tanks could be used for the same production volume. However, the dry vacuum process also has disadvantages. For example, severe foaming tends to occur when a thick impregnation liquid first enters the vacuum environment of an evacuated tank. This foam has been observed to cover large areas of the vacuum impregnation system, where it dries to a hard coating. Also, in contrast to thin monomers, the thick impregnation liquid does not drain well from the side walls of the tank at the end of a cycle. Thus, the foamed impregnation liquid and any other impregnation liquid that contacts the tank walls during the process forms a thick difficult to remove deposit on the side walls of the tank after only a few operating cycles. This problem is compounded by the fact that the impregnation liquid is both highly adhesive and resistant to solvent attack. Thus, cleaning the inside of the tank would almost certainly require a vessel entry by an operator, which leads to operational complications, such as the need to schedule operating downtime and enhanced requirements for ensuring the safety of the operators.

Thus, the state of the art of vacuum impregnation systems can be further improved.

SUMMARY OF THE INVENTION

Applicants invention is directed to solving one or more of the disadvantages described above with a dry vacuum impregnation system and dry impregnation process as disclosed herein.

According to one aspect of the present invention ("Aspect 1"), a vacuum impregnation system is provided which is comprised of, consists essentially of, or consists of:

a vacuum tank comprising a receptacle and a removable lid, the receptacle and lid forming, when the lid is on the receptacle, a generally enclosed vacuum chamber;

a rack fixed or removably supported inside the vacuum chamber and configured to hold one or more articles thereon;

an inner tank movably mounted to the receptacle and configured to hold a quantity of impregnation liquid therein, the inner tank being movable in a vertical direction between a first position in which the one or more articles are not immersed in the impregnation liquid, and a second position in which the one or more articles are at least partially immersed in the impregnation liquid; and a vacuum and pressure control system comprising one or more gas control circuits in fluid communication with the vacuum chamber when the lid is on the receptacle.

Aspect 2. The vacuum impregnation system of Aspect 1, wherein the rack is removably supported inside the vacuum chamber by at least one attachment.

Aspect 3. The vacuum impregnation system of any of the foregoing Aspects, wherein the rack is fixed to the lid or the receptacle.

Aspect 4. The vacuum impregnation system of any of the foregoing Aspects, wherein the inner tank is mounted on a shaft that extends through a seal at a bottom of the receptacle.

Aspect 5. The vacuum impregnation system of any of the foregoing Aspects, wherein the inner tank is removably mounted on the shaft.

Aspect 6. The vacuum impregnation system of any of the foregoing Aspects, wherein the shaft comprises a linear slider.

Aspect 7. The vacuum impregnation system of any of the foregoing Aspects, further comprising an actuator attached to the shaft and configured to move the inner tank between the first position and the second position.

Aspect 8. The vacuum impregnation system of any of the foregoing Aspects, further comprising a fluid control circuit extending from the inner tank to a source of impregnation liquid.

Aspect 9. The vacuum impregnation system of any of the foregoing Aspects, wherein the fluid control circuit comprises a flexible passage extending from the inner tank to a fluid port in the receptacle.

Aspect 10. The vacuum impregnation system of any of the foregoing Aspects, wherein the fluid control circuit comprises a passage extending through the shaft.

Aspect 11. The vacuum impregnation system of any of the foregoing Aspects, wherein the vacuum control system comprises one or more of: a first gas control circuit in communication with a vacuum pump, a second gas control circuit in communication with a source of pressurized gas, and a selectively openable vent.

Aspect 12. The vacuum impregnation system of any of the foregoing Aspects, wherein the inner tank is coated with a non-stick coating.

Aspect 13. The vacuum impregnation system of any of the foregoing Aspects, wherein the inner tank includes a removable inner liner.

Aspect 14. The vacuum impregnation system of any of the foregoing Aspects, wherein the liner is a reusable or disposable liner of metal or plastic material.

Aspect 15. The vacuum impregnation system of any of the foregoing Aspects, wherein the inner tank comprises a removable inner circumferential band positioned inside the inner tank Aspect 16. The vacuum impregnation system of any of the foregoing Aspects, wherein the band comprises a flattened ring pressed against the inner surface of the inner tank and isolates the inner tank from the impregnating liquid at the air/impregnant interface.

According to another aspect of the present invention ("Aspect 17"), a method of operating a vacuum impregnation system is provided which is comprised of, consists essentially of, or consists of the following steps:

(a) positioning one or more articles in a vacuum tank at an ambient air pressure;

(b) after step (a), sealing the vacuum tank;

(c) providing a quantity of impregnation liquid in an inner tank located inside the vacuum tank and below the one or more articles;

(d) after steps (a) and (b), reducing an internal pressure inside the vacuum tank to below the ambient air pressure;

(e) after steps (c) and (d), raising the inner tank to at least partially immerse the one or more articles in the impregnation liquid;

(f) after step (e), increasing the internal pressure inside the vacuum tank to above the ambient air pressure;

(g) after step (f), lowering the inner tank to a position at which the one or more articles are not immersed in the impregnation liquid within the inner tank;

(h) after step (g), reducing the internal pressure inside the vacuum tank to ambient air pressure; and (i) after step (h), unsealing the vacuum tank and removing the one or more articles from the vacuum tank.

Aspect 18. The method of any of the foregoing Aspects, wherein step (c) is performed before and/or simultaneously with step (a) or step (b).

Aspect 19. The method of any of the foregoing Aspects, wherein step (c) is performed after step (b).

Aspect 20. The method of any of the foregoing Aspects, wherein step (d) is performed after completing step (c).

Aspect 21. The method of any of the foregoing Aspects, wherein the vacuum tank comprises a receptacle and a removable lid, and step (a) comprises attaching a rack holding the one or more articles to the receptacle.

Aspect 22. The method of any of the foregoing Aspects, wherein the vacuum tank comprises a receptacle and a removable lid, and step (a) comprises attaching a rack holding the one or more articles to the lid.

Aspect 23. The method of any of the foregoing Aspects, wherein step (c) comprises pumping the quantity of impregnation liquid from outside the vacuum tank, through a flexible passage, and into the inner tank.

Aspect 24. The method of any of the foregoing Aspects, wherein the inner tank is attached to a shaft that extends through a seal at a bottom of the vacuum tank, and step (e) comprises raising the shaft, and step (g) comprises lowering the shaft.

Aspect 25. The method of any of the foregoing Aspects, wherein step (c) comprises pumping the quantity of impregnation liquid from outside the vacuum tank, through a passage extending through the shaft, and into the inner tank.

Aspect 26. The method of any of the foregoing Aspects, further comprising (j) after step (i), drying the one or more articles from the vacuum tank in the absence of cross-linking.

Aspect 27. The method of any of the foregoing Aspects, wherein step (j) comprises air drying or heating to convert the impregnant liquid to a solid.

In one embodiment, the dry vacuum impregnation system includes a tank-inside-a-tank structure in which the impregnating polymer is contained in an open-top inner tank disposed within a pressure resistant outer tank having a blind lower portion and an upper portion terminating in a sealable opening. The inner tank is disposed below the upper portion of the outer tank into which parts to be impregnated are introduced through the sealable opening. Instead of moving the impregnating polymer, from vessel to vessel, the inner tank containing the polymer is movably disposed within the outer tank, and in use the inner tank is moved upward to encompass the parts to be coated until the parts are submerged in the impregnating polymer. In this manner, foaming of the impregnating polymer generated by turbulent flow of the polymer between a reservoir tank and the vacuum impregnation tank and the excessive foaming caused by introducing polymer into a tank under vacuum is greatly reduced.

With the inner tank containing the polymer solution at the bottom of its traverse, parts to be sealed are lowered, preferably by a hoist or the like, into the outer tank and the parts are suspended above the polymer liquid, typically on a rack or other support. The outer tank top is then closed, the pressure resistant outer tank is sealed, and vacuum is applied to evacuate air from within the pressure resistant outer tank of the vacuum impregnation system including the pores/gaps of the parts. The inner tank then travels up to thereby immerse the parts in the polymer solution and the vacuum is released which aids in moving the polymer liquid into gaps and pores. The outer tank is then pressurized to greater than atmospheric pressure, which forces additional thick polymer into pore/gaps of the parts. After a selected time, about 30 seconds to 300 seconds, the pressure is released and returns to atmospheric pressure, the inner tank is lowered, and excess polymer drips off of the outer surface of the parts and rack back into the inner tank. The rack is raised, optionally a catch tray for excess polymer is placed under the rack, and the rack is then removed and transported to a cleaning station, where excess polymer on the surfaces of the part is removed and thence to a drying station, where the polymer is allowed to dry, which converts the viscous polymeric liquid to a solid form, optionally with elastomeric qualities, to thereby seal the pores and gaps of the article.

Notably, where dry vacuum is used, the vacuum impregnation vessel need not have the large footprint of multiple shallow tanks to accommodate head pressure issues of wet vacuum processes. Accordingly, deeper tanks of smaller diameter can be used without negatively impacting seal quality.

BRIEF DESCRIPTION OF THE DRAWINGS

In the Figures, like reference numbers indicated like features.

DETAILED DESCRIPTION

The embodiments described herein relate to a vacuum impregnation system and method for operating a vacuum impregnation system. It will be understood that the embodiments discussed herein are exemplary, and other embodiments may encompass various different aspects or combinations of features described herein.

Figure 1:
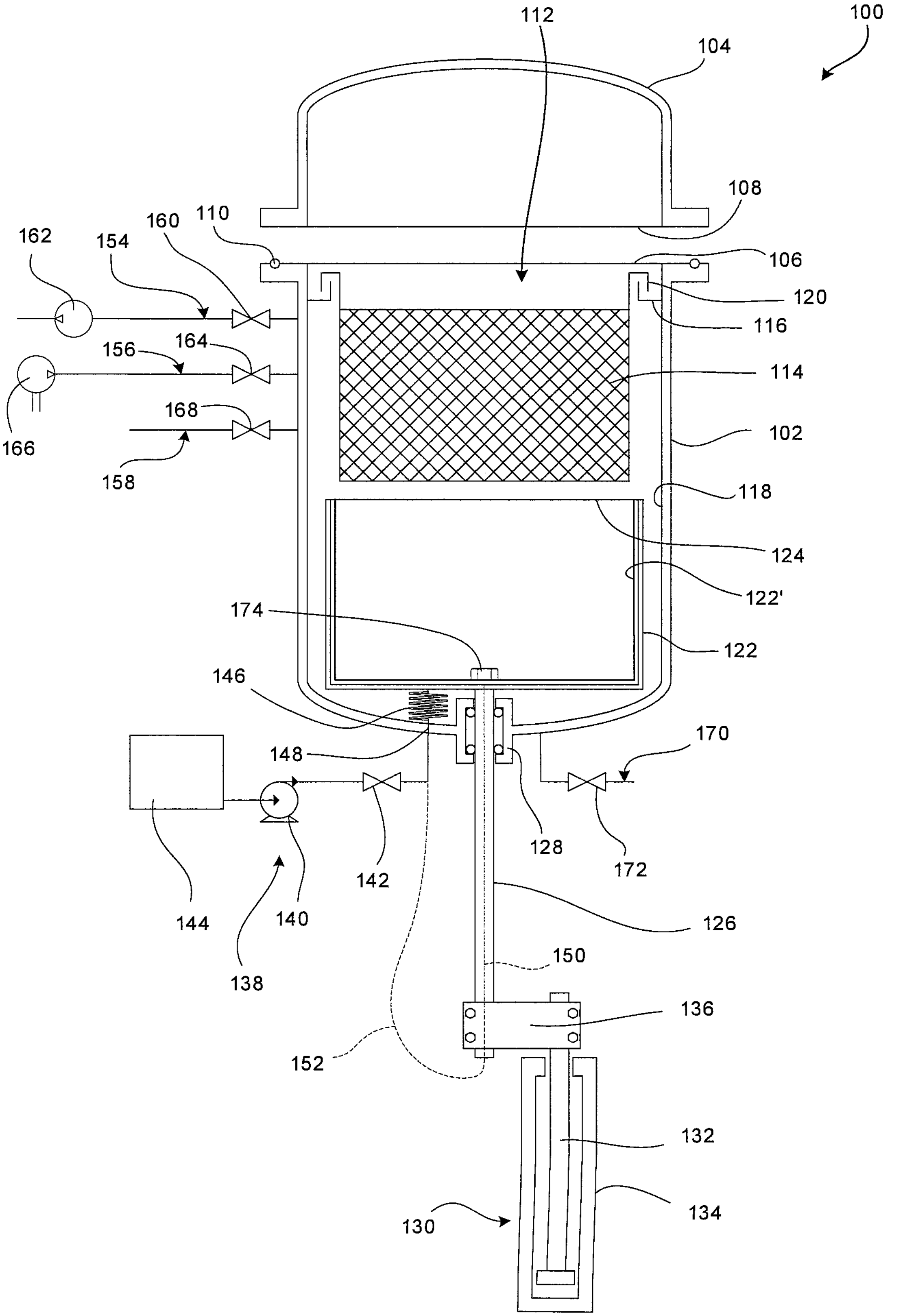
FIG. 1 is a schematic illustration of an exemplary vacuum impregnation system.

FIG. 1 illustrates a first exemplary embodiment of a vacuum impregnation system 100. The system 100 includes a vacuum tank formed by a receptacle 102 and a lid 104. The receptacle 102 is configured as the lower portion of the vacuum tank, and is generally fluid tight. The lid 104 is configured as the upper portion of the vacuum tank, and is also generally fluid tight. The receptacle 102 terminates at its upper end at an upward-facing opening 106, and the lid 104 has a similarly-shaped downward-facing opening 108. The lid 104 can be secured to the receptacle 102 to form a generally fluid and pressure tight vacuum chamber 112. One or both openings 106, 108 may be surrounded by or include an O-ring 110 or other seal(s), which may be provided on radially-extending flanges, to assist with forming the generally fluid tight enclosure. As used herein, "generally fluid tight" means that no gas or liquid, or only a nominal quantity of gas or liquid that does not affect operation of the system, can pass through the structure when all operative passages and openings are closed.

The receptacle 102 and lid 104 preferably may be formed in the shape of a conventional pressure vessel, having cylindrical sidewalls that terminate at domed, hemispherical, torispherical or semi-elliptical heads. However, the receptacle 102 and lid 104 may collectively form a spherical shape, or other shapes. The vacuum tank may be configured to contain the desired operating pressures and vacuums, as well as to withstand the expected operating temperatures. For example, the vacuum tank may be rated to operate at internal pressures ranging from 10 mm Hg of vacuum to 20 atmospheres of positive pressure, or more preferably at 20 mm Hg of vacuum to 10 atmospheres of positive pressure. The vacuum tank also may be rated to operate at 5° C. to 200° C., and more preferably at 15° C. to 100° C.

The system 100 also includes a rack 114 (or multiple racks) configured to be positioned in the vacuum tank inside the vacuum chamber 112, either fixed inside the vacuum chamber or removably supported inside the vacuum chamber. The rack 114 or racks, may be fixed to one or both of the receptacle 102 and the lid 104. The rack 114 preferably is removably supported and/or secured in the vacuum tank. For example, the receptacle 102 may include an internal lip 116 that extends radially-inward from the inner wall surface 118 of the receptacle, and the rack 114 may include an external lip 120 that extends radially outward from the rack 114 to engage the internal lip 116 and hold the rack 114 at a predetermined vertical position within the vacuum chamber 112. Other embodiments may use other mechanisms to secure the rack 114 to the receptacle 102 or lid 104, such as hooks or the like.

The connection mechanism may be configured for automated installation and removal of the rack 114 from the vacuum chamber 112. For example, the internal and external lips 116, 120 may be configured to support the rack 114 in the vertical direction, but allow some radial and rotational movement to account for imprecision in the operation of the loading equipment (e.g., a crane or ceiling hoist). If desired, a mechanism may be provided to fix the rack's position in all directions, such as bolts or clamps to prevent any movement of the rack 114 once it is in place. Other alternatives and variations will be apparent to persons of ordinary skill in the art in view of the present disclosure.

In other embodiments, the rack 114 may be permanently affixed to the receptacle 102 or the lid 104. For example, the rack 114 could be welded in place, or secured by fasteners that are not intended to allow removal of the rack during normal operation and cleaning procedures. In this case, removable holders, supports, baskets and the like, as are further described below, may be used to position parts in the rack for impregnation and optionally transport.

The rack 114 is also configured to hold one or more articles that are to be vacuum impregnated, and to allow the impregnation liquid to contact the articles. For example, the rack 114 may comprise a mesh basket or series of nested mesh baskets that support the articles from the bottom, or one or more hooks that are capable of holding corresponding openings in the articles. The rack 114 also may be configured to suspend the article or articles without the rack 114 being immersed in the impregnation liquid. For example, each article may be suspended from the rack 114 by an intermediate disposable connector, such as a strand or loop of plastic material. Other alternatives and variations will be apparent to persons of ordinary skill in the art in view of the present disclosure.

The system 100 further includes an inner tank 122, which is generally closed at the lower end such that it can hold a quantity of impregnation liquid, but has an open top 124 that is dimensioned and shaped to receive the rack 114 and/or articles held by or suspended from the rack. For example, the inner tank 122 may comprise a cylindrical chamber that is slightly smaller in diameter than the adjacent portion of the receptacle's inner wall surface 118. The inner tank 122 may have a coating of a so-called non-stick material, for example polytetrafluoroethylene(PTFE) and/or may include a removable inner liner 122', such as a reusable or disposable liner of metal or plastic material, which is expected to facilitate periodic cleaning of the inner tank 122 and permit selection of less expensive materials for fabrication of the inner tank 122 and the receptacle 102. For example, for surfaces that are not directly contacted by the polymeric impregnation liquid, which may be corrosive, stainless steel can be replaced with lower grades of steel, such as carbon steel, aluminum or other suitable metals which do not interfere with objects of the invention.

The inner tank 122 is movably mounted to the receptacle 102, such that it can move vertically between a first position in which the articles held by the rack are not immersed in the impregnation liquid within the tank, and a second position in which the articles are at least partially (and preferably fully) immersed in the impregnation liquid. The operation of the inner tank 122 is described in more detail below.

The inner tank 122 may be movably mounted to the receptacle 102 using any suitable mechanism. In the shown example, the inner tank 122 is mounted on a shaft 126 that extends through a seal 128 at a bottom of the receptacle 102. The shaft 126 and seal 128 may have any suitable construction to provide a pressure-tight or pressure-resistant seal. For example, the shaft 126 may comprise a polished stainless steel cylinder that extends through an opening through the bottom of the receptacle 102 with one or more mechanical or gland seals mounted in the opening and extending radially to contact the shaft 126 to forming a sliding seal 128. The seal 128 may include any suitable arrangement of wipers, sealing lips, compression rings, O-rings, V-rings, wedges, packing material, or the like, as known in the art of hydraulic seals. In this case, the shaft 126 is a linear slider that moves axially along the length of the shaft 126, without necessarily rotating about the shaft's axis. In other cases, the shaft 126 may comprise a lead screw that engages internal threads within the bottom of the receptacle 102, or have other configurations.

An actuator 130 is attached to the shaft 126 and configured to move the inner tank 122 between the first (lowered) position and the second (raised) position. In the shown example, the actuator 130 comprises a hydraulic or pneumatic piston 132 and cylinder 134 assembly, which generates motive force by pressurizing the cylinder chamber, as known in the art. In this case, the piston 132 is attached to the shaft 126 by a rigid connector 136. Thus, operating the actuator 130 moves the piston 132 upwards, thereby moving the inner tank 122 from the first position to the second position. It will be readily appreciated that this configuration may be modified in various ways. For example, the piston 132 may be fixed in place, and the cylinder 134 connected to the shaft 126. As another example, the shaft 126 may be shaped as a piston that fits directly into a corresponding hydraulic or pneumatic cylinder. As another example the connector 136 may comprise one or more mechanisms, such as chains and sprockets, belts and pulleys, gears, transmissions, levers, linkages, or the like, to convert motion of the piston 132 into motion of the shaft 126. It will also be appreciated that the actuator 130 may alternatively comprise an electric motor, or any other source of powered motion. The particular nature of the actuator 130 and its connection to the shaft 126 is not critical to the invention, and many variations will be appreciated in view of this disclosure.

The vacuum impregnation system 100 also includes a fluid control circuit 138 configured to provide impregnation liquid to the inner tank 122. The fluid control circuit 138 includes any suitable arrangement of valves, passages and/or pumps for conveying impregnation liquid to (and optionally from) the inner tank 122. For example, the fluid control circuit 138 may include a pump 140 and impregnation liquid valve 142 that are fluidly connected in series to an impregnation liquid source 144 (e.g., a tank or supply passage).

The fluid control circuit 138 may be connected to the inner tank 122 by various arrangements of fluid passages. In the example of FIG. 1, a flexible passage 146 extends from the inner tank 122 to a fluid port 148 that passes through the receptacle 102. The fluid port 148 may any suitable arrangement of fittings (e.g., a pipe with or without threaded connectors, or the like), such as well-known in the art of pressure vessel design. The flexible passage 146 may comprise a flexible hose or the like, and is dimensioned to allow the inner tank 122 to move between the first and second positions without hindering the movement of the inner tank 122 or occluding the hose, and preferably is abrasion resistant to prevent damage from repeated contact with other parts. Steel-braided pressure-rated hose or other suitable hose may be used for this purpose, but other alternatives will be apparent to persons of ordinary skill in the art in view of the present disclosure.

As also shown in FIG. 1, the fluid control circuit 138 may alternatively be connected to the inner tank 122 by a passage 150 that extends through the shaft 126. This eliminates the need to provide a flexible passage 146 inside the tank environment, but it may necessitate a flexible passage 152 to connect the shaft passage 150 to other parts of the fluid control circuit 138.

Embodiments using a flexible passage 146 or the shaft 150 to deliver impregnation liquid to the inner tank 122 both provide the option to selectively remove the impregnation liquid from the inner tank 122 by draining or pumping in a reverse flow direction. This may be advantageous to return impregnation liquid to storage for later use, to prepare the inner tank 122 for cleaning, or to provide other benefits.

Nevertheless, in other embodiments, the fluid control circuit 138 may be configured such that it can only deliver impregnation liquid to the inner tank 122. For example, the fluid control circuit 138 may deliver the impregnation liquid through the open top 124 of the inner tank 122. In one such embodiment, the fluid control circuit 138 may comprise an outlet nozzle attached to the inner wall surface 118 of the receptacle 102 at a location above the open top 124 when the inner tank 122 is in the first position. In this case, the impregnation liquid may be pumped through the nozzle to pour or spray into the inner tank 122, but cannot be removed by reverse flow. The fluid control circuit 138 also may be configured to pour the impregnation liquid into the inner tank 122 through the upper end 106 of the receptacle 102 before the lid 104 is attached. Other alternatives and variations will be apparent to persons of ordinary skill in the art in view of the present disclosure.

It is also envisioned that multiple inner tanks 122 may be used in some embodiments. Such multiple tanks 122 may be useful to perform vacuum impregnation of some articles using a different impregnation liquid, or to perform vacuum impregnation of smaller batches of articles without requiring the entire volume of a single inner tank 122 to be filled. The multiple inner tanks 122 may be movable together (e.g., attached to the same shaft 126 or provided as discrete subdivisions of a single unified structure), or movable individually (e.g., mounted on separate shafts and having separate operating systems).

The inner tank 122 also may be removable, such as for cleaning thereof without entry of personnel into the receptacle and to facilitate continued processing of parts using a replacement tank. The inner tank 122 may also be replaceable with a tank having different dimensions, or filled to different levels, to vacuum impregnate different articles or combinations of articles.

The inner tank 122 may be fitted with a removable inner circumferential band positioned inside the inner tank at about the impregnating liquid's surface, e.g. the air/impregnant interface. The band forms a flattened ring pressed against the inner surface of the inner tank 122, and can be for example a spring-loaded metal ring. The band isolates the inner tank from the impregnating liquid at the air/impregnant interface, and can collect polymeric deposits generated during processing on the band's surface thereby facilitating easy removal of the deposits. This feature may be used in instead of or in combination with a liner 122'.

The vacuum impregnation system 100 also includes a vacuum control system that is operated to control the gas pressure inside the vacuum chamber 112. For example, the vacuum control system may include a first gas control circuit 154 that is used to reduce gas pressure inside the vacuum chamber 112 below the ambient pressure outside the vacuum tank, a second gas control circuit 156 that is used to increase the gas pressure in the vacuum chamber 112 above the ambient pressure outside the vacuum tank, and a third gas control circuit 158 that is used to equalize the pressure inside the vacuum chamber 112 with the ambient pressure outside the vacuum tank.

The gas control circuits 154, 156, 158 may incorporate any suitable arrangement of equipment to provide the desired functions. For example, in the shown embodiment, the first gas control circuit 154 may comprise a first valve 160 that connects the vacuum tank to a vacuum pump 162, the second gas control circuit 156 may comprise a second valve 164 that connects the vacuum tank to a compressor 166, and the third gas control circuit may comprise a third valve 168 that connects the vacuum tank to ambient air. The components of the vacuum control system also may include other devices, such as filters, liquid traps, gauges, and the like. Any automated or manually-operated control system may be used to operate the components of the vacuum control system. Other alternatives and variations will be apparent to persons of ordinary skill in the art in view of the present disclosure.

The vacuum impregnation system 100 also preferably includes a liquid vent circuit 170, such as a liquid vent valve 172 that is configured to drain impregnation liquid, condensation, and any other liquids from the bottom of the vacuum tank.

The selection and use of valves, vacuum pumps, compressors, and the like, are well known in the art of vacuum impregnation systems, and need not be discussed in further detail herein.

Figure 2:
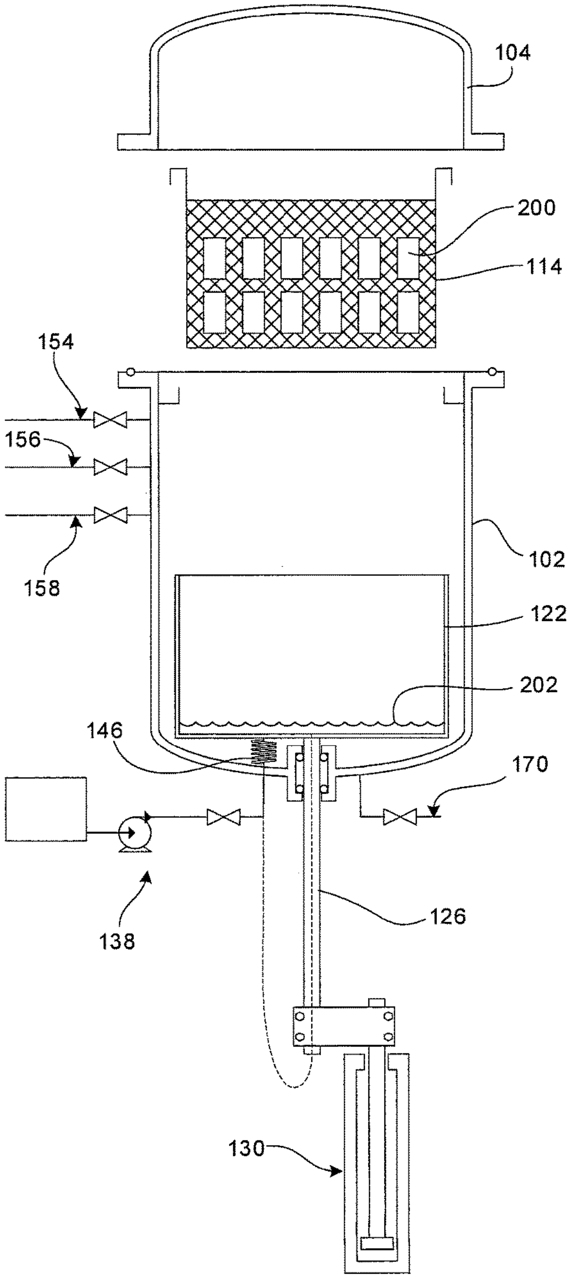
FIG. 2 illustrates the embodiment of FIG. 1 in a first operational state.
Figure 3:
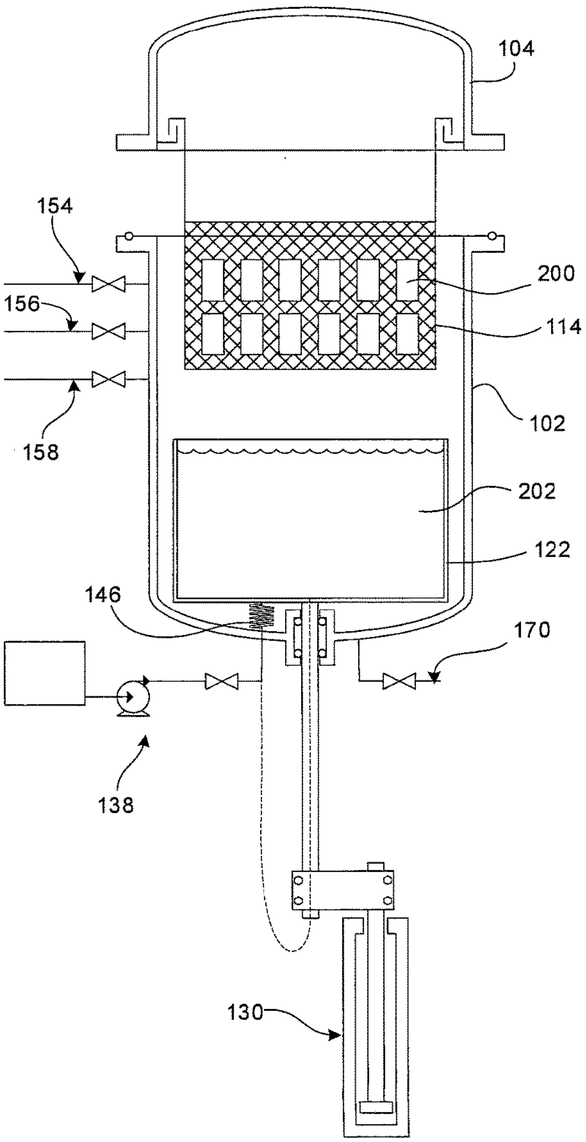
FIG. 3 illustrates an alternative embodiment of an exemplary impregnation system in a first operational state.
Figure 4:
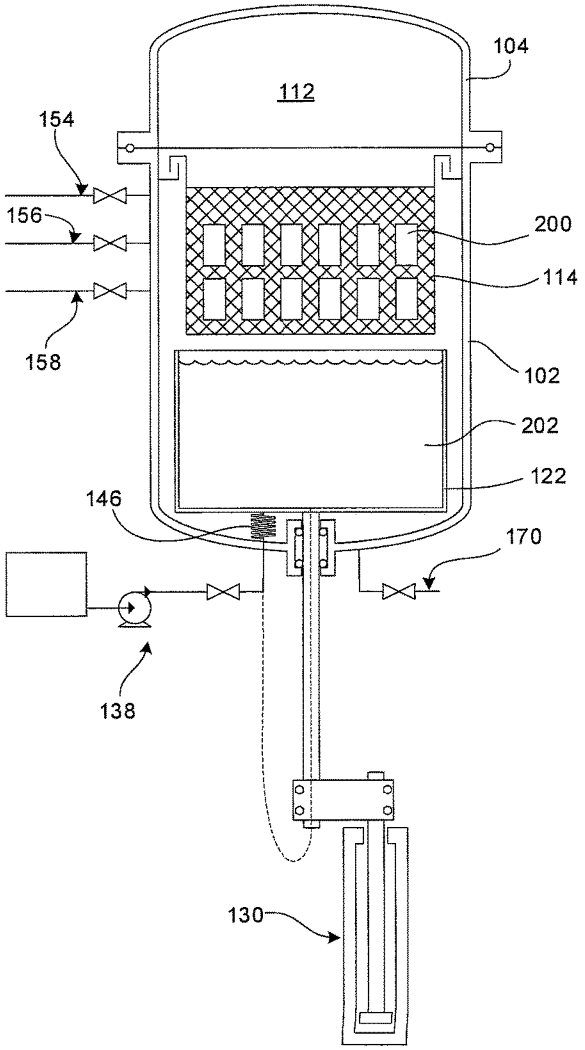
FIG. 4 illustrates the embodiment of FIG. 1 in a second operational state.
Figure 5:
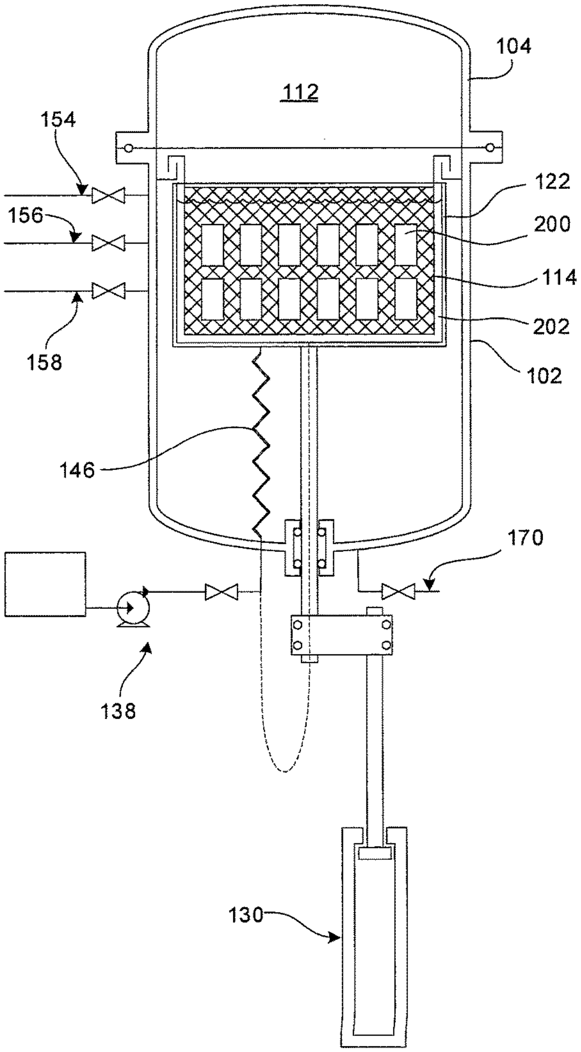
FIG. 5 illustrates the embodiment of FIG. 1 in a third operational state.
Figure 6:
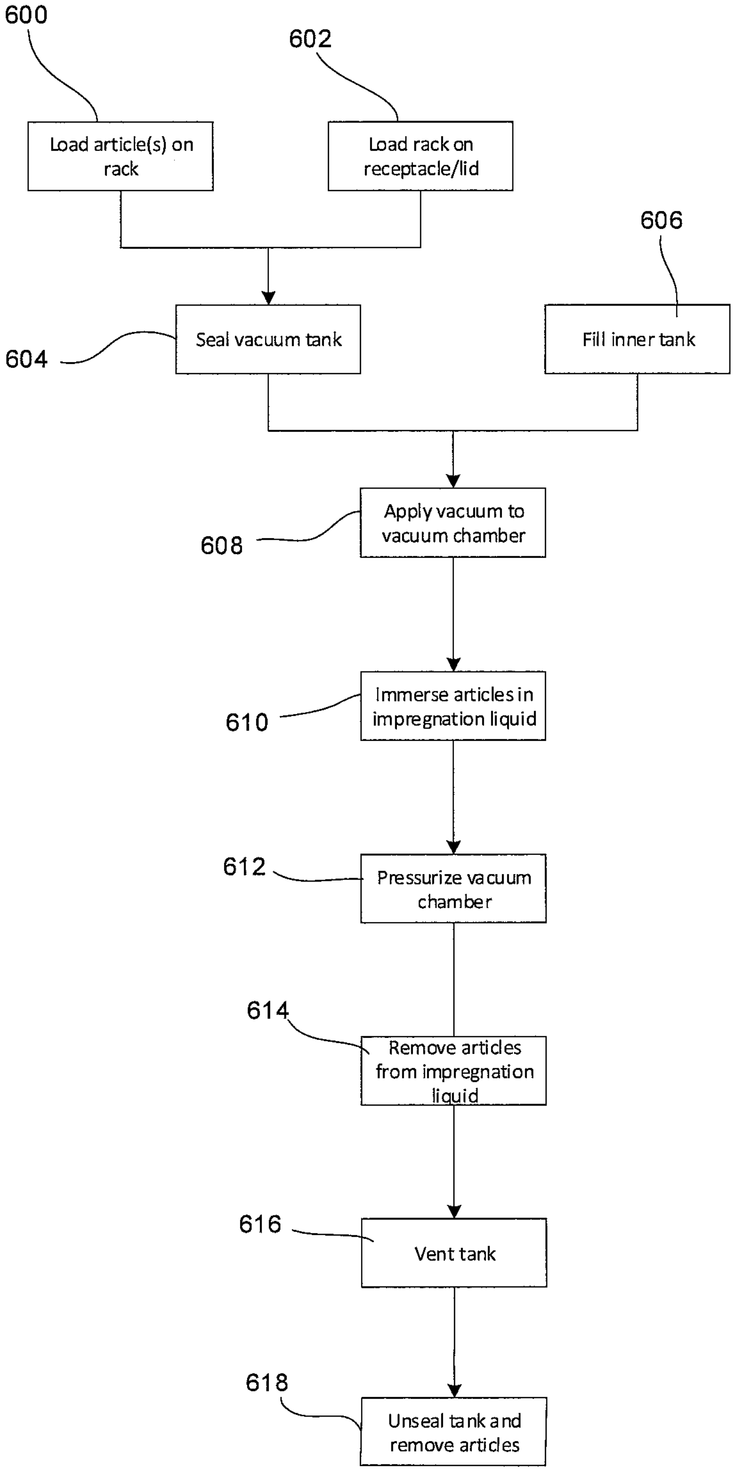
FIG. 6 illustrates an exemplary method for operating a vacuum impregnation system.

Exemplary methods for operating the vacuum impregnation system 100 and other embodiments are illustrated in FIGS. 2 through 6. An exemplary process begins by loading articles 200 to be sealed onto the rack 114 (step 600), loading the rack 114 onto the receptacle 102 or lid 104 (step 602), and sealing the vacuum tank by securing the lid 104 to the receptacle 102 (step 604). Steps 600 and 602 may be performed in any order (i.e., the articles 200 may be loaded on the rack 114 before or after the rack 114 is fixed to the receptacle 102 or lid 104). FIG. 2 shows the articles being secured to the rack 114 before the rack 114 is secure to the receptacle 102. FIG. 3 shows the rack 114 being secured to the lid 104 as an alternative embodiment. If the rack 114 is permanently affixed to the vacuum tank, step 602 is satisfied by default. FIG. 4 shows the rack 114 secured to the vacuum tank, and the lid 104 secured to the receptacle 102 to form the sealed vacuum chamber 112.

In step 606, the inner tank 122 is filled to the desired level with impregnation liquid 202. Step 606 may be performed before or after the lid 104 is sealed to the receptacle 102. For example, FIG. 2 shows the impregnation liquid 202 at a low level (or it may be completely absent) during loading of the rack 114, and the impregnation liquid 202 may be maintained at this level until the lid 104 is sealed to the receptacle 102. In contrast, FIG. 3 shows the impregnation 202 being filled to a working level prior to sealing the lid 104 to the receptacle 102.

Step 608 is performed after sealing the lid 104 to the receptacle 102. In step 608, a vacuum is generated in the vacuum chamber 112, such as by operating the first gas control circuit 154 to pump ambient air out of the vacuum chamber 112. If desired, one or more purge steps may be performed before step 608 to help remove gasses in the ambient air that might impede the process. For example, nitrogen may be pumped into the vacuum chamber 112 to displace the ambient air prior to performing step 608.

Step 608 preferably is performed after the inner tank 122 is filled with the impregnation liquid in step 606. This helps prevent foaming of the impregnation liquid 20 as could happen if the liquid is introduced into a vacuum atmosphere, and provides a significant improvement by facilitating easier, safer and/or less frequent cleaning of the vacuum tank. However, it is contemplated that by introducing the impregnation liquid 202 into the confines of the inner tank 122, the problems associated with foaming can be isolated at least to some degree to the inner tank 122. In this case, most of all of the cleaning process would be directed to cleaning the inner tank 122, and this process can be facilitated by making the inner tank 122 removable (e.g., mounting it to the shaft 126 by a nut 174 or other fastener(s)), or providing a removable liner 122' in the inner tank 122. Thus, embodiments may optionally perform the vacuum generating step 608 before, or simultaneously with, introducing the impregnation liquid in step 606.

Next, in step 610, the inner tank 122 is raised by operating the actuator 130, until the articles 200 to be vacuum impregnated are immersed in the impregnation liquid 202. The articles 200 may be entirely immersed, or only immersed to a desired degree if impregnation is not required for the entire article 200. When immersed, the impregnation liquid surrounds the articles and the pores and gaps that are to be filled, and may enter such pores and gaps to some degree.

Performing step 610 after step 608 makes this a dry vacuum impregnation process (i.e., the vacuum is generated before immersing the articles 200). This is expected to reduce or eliminate inconsistent impregnation of the articles at different locations within the vacuum chamber 112, because generation of the vacuum in the pores is not competing with hydraulic head pressure generated by the immersion liquid. This allows the vacuum tank to be relatively large in the vertical direction, leading to larger processing volumes for a given capital investment in processing equipment.

While the articles 200 are immersed, the process moves to step 612, in which the second gas control circuit 156 is operated to raise the pressure inside the vacuum chamber 112 to above atmospheric level. Raising the pressure in the closed receptacle impels the impregnation liquid into the evacuated pores and gaps to provide improved sealing.

Next, in step 614, the articles 200 are removed from the impregnation liquid by operating the actuator 130 to lower the inner tank 122 until the impregnation liquid is below the lowest article 200 on the rack 114. During and after this step, residual impregnation liquid 202 on the articles 200 can drain from the articles 200 to the inner tank 122 to be reused or recycled.

Finally, in steps 616 and 618, the vacuum chamber 112 is vented by operating the third gas control circuit 158, and the articles 200 are removed.

It will be appreciated that some or all of the foregoing process steps may be performed according to various operating parameters. Examples of such parameters include: the magnitude of the vacuum generated in step 608, the magnitude of the pressure the generated in step 912, the duration of immersion in step 610, the wait time before venting the tank in step 616, and so on. In addition, the temperatures of the articles 200, the atmosphere in the vacuum chamber 112, and the impregnation liquid 202 all may be modulated. The precise desirable values or ranges for such variables can be determined with routine experimentation.

Embodiments are expected to be particularly useful when used with relatively viscous impregnation liquids, which may be selected to have more or less adhesive nature depending upon whether the article is an assembly that may require disassembly for maintenance. Preferably, the impregnation liquid is selected to provide uniform and consistent seal formation, with durable seals being formed between the sealing material and a wide variety of materials making up the assembly, including both metal and plastic. The impregnation liquid also preferably is provided as an inert polymer dissolved or dispersed in solvent, preferably water, which eliminates the need for a separate curing step and only requires evaporation of residual carrier or solvent, most preferably water, to finalize the seal. Inert polymers will be understood by those skilled in the polymer arts to mean polymers lacking sufficient functional groups that impart specific chemical reactivity to the polymer. Suitable inert polymers may include by way of non-limiting example, polyacrylates, polyvinyl alcohols, polyurethanes, polyvinyl acetates and the like. The impregnation liquid may optionally include additives known for use in formulating adhesives and sealants, such as rheology aids, wetting agents, anti-aging agents, stabilizers, biostats and/or color pigments. Generally, the thick impregnation polymer materials have viscosities in a range of about 50 Pa·s to as much as 5000 mPa·s or more depending on the non-Newtonian behavior of the polymer (50-5000 centipoise) solution.

Embodiments may be configured to seal pores and gaps in a variety of articles, including articles having both metal and plastic parts. Exemplary articles include, but are not limited to: telecommunication equipment (e.g., radios, cellular phones, etc.); audio equipment (e.g., headphones, speakers, microphones); and other electronic equipment such as computers, processing units, electronic controllers, wiring harnesses, electrical connectors, and the like.

As noted previously, although the invention is illustrated and described herein with reference to specific embodiments, the invention is not intended to be limited to the details shown. Rather, various modifications may be made in the details within the scope and range of equivalents of the claims and without departing from the invention.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. A method for operating a vacuum impregnation system, the method comprising:

(a) positioning one or more articles in an internal space defined by a vacuum tank at an ambient air pressure;

(b) after step (a), sealing the vacuum tank;

(c) providing a quantity of impregnation liquid in an inner tank located inside the vacuum tank and below the one or more articles;

(d) after steps (a) and (b), reducing an internal pressure inside the entirety of the internal space defined by the vacuum tank to below the ambient air pressure to produce a reduced pressure environment so that the entirety of each of the one or more articles is within the reduced pressure environment;

(e) after steps (c) and (d), raising the inner tank to at least partially immerse the one or more articles in the impregnation liquid;

(f) after step (e), increasing the internal pressure inside the vacuum tank to above the ambient air pressure;

(g) after step (f), lowering the inner tank to a position at which the one or more articles are not immersed in the impregnation liquid within the inner tank;

(h) after step (g), reducing the internal pressure inside the vacuum tank to ambient air pressure; and (i) after step (h), unsealing the vacuum tank and removing the one or more articles from the vacuum tank.

2. The method of claim 1, wherein step (c) is performed before and/or simultaneously with step (a) or step (b).

3. The method of claim 1, wherein step (c) is performed after step (b).

4. The method of claim 1, wherein step (d) is performed after completing step (c).

5. The method of claim 1, wherein the vacuum tank comprises a receptacle and a removable lid, and step (a) comprises attaching a rack holding the one or more articles to the receptacle.

6. The method of claim 1, wherein the vacuum tank comprises a receptacle and a removable lid, and step (a) comprises attaching a rack holding the one or more articles to the lid.

7. The method of claim 1, wherein step (c) comprises pumping the quantity of impregnation liquid from outside the vacuum tank, through a flexible passage, and into the inner tank.

8. The method of claim 1, wherein the inner tank is attached to a shaft that extends through a seal at a bottom of the vacuum tank, and step (e) comprises raising the shaft, and step (g) comprises lowering the shaft.

9. The method of claim 8, wherein step (c) comprises pumping the quantity of impregnation liquid from outside the vacuum tank, through a passage extending through the shaft, and into the inner tank.

10. The method of claim 1, further comprising (j) after step (i), drying the one or more articles from the vacuum tank in the absence of cross-linking.

11. The method of claim 10, wherein step (j) comprises air drying or heating to convert the impregnant liquid to a solid.

12. The method of claim 1, wherein the article comprises metal parts, plastic parts, or both.

13. The method of claim 1, wherein the article comprises telecommunication equipment, audio equipment, or electronics equipment.

* * * * *